(12) United States Patent
Hesselbarth et al.

(10) Patent No.: US 8,932,402 B2
(45) Date of Patent: Jan. 13, 2015

(54) CONSTRUCTION MATERIALS BINDERS

(75) Inventors: Frank Hesselbarth, Recklinghausen (DE); Udo Dudda, Bochum (DE)

(73) Assignee: Saint-Gobain Weber, Servon (FR)

( * ) Notice: Subject to any disclaimer, the term of this patent is extended or adjusted under 35 U.S.C. 154(b) by 361 days.

(21) Appl. No.: 13/505,176

(22) PCT Filed: Oct. 27, 2010

(86) PCT No.: PCT/FR2010/052300
§ 371 (c)(1),
(2), (4) Date: Apr. 30, 2012

(87) PCT Pub. No.: WO2011/055063
PCT Pub. Date: May 12, 2011

(65) Prior Publication Data
US 2012/0216721 A1 Aug. 30, 2012

(30) Foreign Application Priority Data
Nov. 5, 2009 (FR) ..................................... 09 57824

(51) Int. Cl.
*C04B 7/21* (2006.01)
*C04B 18/08* (2006.01)
*C04B 28/14* (2006.01)
*C04B 28/08* (2006.01)
*C04B 7/153* (2006.01)
*C04B 111/32* (2006.01)

(52) U.S. Cl.
CPC ............... *C04B 28/08* (2013.01); *C04B 7/1535* (2013.01); *C04B 2111/32* (2013.01)
USPC ........... 106/790; 106/695; 106/705; 106/706; 106/707; 106/709; 106/773; 106/775; 106/776; 106/782; 106/789; 106/811

(58) Field of Classification Search
CPC ........ C04B 7/1535; C04B 7/14; C04B 14/10; C04B 14/12; C04B 18/08; C04B 18/141; C04B 22/062; C04B 22/064; C04B 22/10; C04B 22/143; C04B 22/144; C04B 28/08; C04B 2111/32

USPC ......... 106/695, 705, 706, 707, 709, 789, 790, 106/811, 773, 775, 776, 782, 786
See application file for complete search history.

(56) References Cited

U.S. PATENT DOCUMENTS

| 5,311,944 A * | 5/1994 | Cowan et al. ................. 166/292 |
| 2003/0167972 A1 | 9/2003 | Ko |
| 2008/0066655 A1 | 3/2008 | Fraser |

FOREIGN PATENT DOCUMENTS

| DE | 195 01 100 | 7/1996 |
| EP | 0 814 067 | 12/1997 |
| EP | 1 900 705 | 3/2008 |
| JP | 2000 72519 | 3/2000 |
| WO | 91 19687 | 12/1991 |
| WO | 02 28794 | 4/2002 |

OTHER PUBLICATIONS

Derwent-Acc-No: 2002-605473, abstract of Korean Patent Specification KR 2002019946 A (Mar. 2002).*
Imaizumi, K., et al., "Manufacture of fiber-reinforced lightweight cement-gypsum-slag product," Chemical Abstracts, vol. 115, No. 55743, p. 385, (Aug. 12, 1991), XP 000251294 (Abstract only).
International Search Report Issued Apr. 15, 2011 in PCT/FR10/052300 Filed Oct. 27, 2010.

* cited by examiner

*Primary Examiner* — Anthony J Green
(74) *Attorney, Agent, or Firm* — Oblon, Spivak, McClelland, Maier & Neustadt, L.L.P.

(57) ABSTRACT

Hydraulic binder comprising:
at least one first calcium aluminosilicate derivative with a fineness of less than 6000 Blaine,
slag microparticles with a fineness of greater than or equal to 6000 Blaine in an amount of between 1 and 35% of the total weight of the binder, preferably of between 5 and 15%,
at least one source of calcium sulphate and
at least one base in an amount of less than or equal to 1% of the total weight of the binder.

20 Claims, No Drawings

CONSTRUCTION MATERIALS BINDERS

The present invention relates to hydraulic binders based on calcium aluminosilicate derivatives, such as blast furnace slags, in the presence of an activator system, and to construction materials obtained from such binders, such as concrete, mortar, prefabricated components or covering panels.

Portland cement, a binder very widely used for the manufacture of concretes, mortars and a broad range of prefabricated components, is composed essentially of clinker, obtained in a first step by crushing starting materials, such as clay and limestone, and then finely ground with the incorporation of a small amount of calcium sulphate.

Although still very widely used, the preparation of Portland cement remains a major source of $CO_2$ emissions. These emissions are mainly due to the calcination process (decarbonation of limestone to give calcium oxide) and to the heating, of the order of 1450° C., which it is necessary to carry out. The development of replacement binders, which make possible a reduced discharge of $CO_2$ into the atmosphere, is an environmental challenge of the very first order. Moreover, the use of Portland cement results in the formation of a large amount of $Ca(OH)_2$ (portlandite), which produces a very high pH (12-13) and may result in durability losses. This is because portlandite is sensitive to carbonation. Carbonated concretes or mortars can lose their integrity and develop pathologies.

Hydraulic binders with complete or partial replacement of the Portland cement by waste from the steel industry, such as slags, are known. Among the most well known, blast furnace cement consists in a mixture of ground granulated blast furnace slags of between 36 and 95% by weight made up in particular with Portland cement clinker, and is identified under the name of class CEM III/A-B-C cement.

Other compositions known from Applications WO2005/097700, US2008/0257223 or WO2009/005205 partially or completely replace the Portland cement clinkers or Portland cement with blast furnace slags or fly ash (resulting from coal-fired power stations). In contrast to Portland cement, such aluminosilicate derivatives are not or only slightly hydraulic by nature, as they do not form hydrated lime (or portlandite) by hydration, and it is necessary to add an alkaline activator or a lime in order to dissolve the aluminosilicate material. Hydrates responsible for the setting of the material are formed by reaction. These compositions of the state of the art, which also comprise variable amounts of source of calcium sulphate which can reach 15% by total weight of the mixture, incorporate alkaline activator agents, such as hydrated lime, soda, potash and even sodium metasilicate. The presence of such alkaline agents, which produce a high pH, can cause serious skin irritation when the cements are used and can thus render them difficult to handle.

The term "activator" within the meaning of the invention defines a system comprising at least one compound intended to improve the setting and/or the curing of the binder.

Application WO2007/096686 relates to a binder composition comprising, on the one hand, a mixture of slag and fly ash and, on the other hand, an activator comprising different bases. The compositions of this patent application are not hydraulic binders directly ready for use. The activators and the mixture of slag with fly ash have in particular to be brought into contact separately with water and then the two fractions are subsequently mixed, which complicates the preparation of the mortars or concretes.

The publication *Cement and Concrete Research*, 29 (1999), 459-462, relates to a study of the use of blast furnace slag dust as accelerator of the curing reaction of a cement. Thus, the addition of 10% of ground granulated blast furnace slag dust, with grains having a fineness of 14 960 $cm^2/g$ (unit commonly used under the Blaine name), makes it possible to improve the physicochemical properties of the binder. The production of such a dust in the form of microparticles requires energy during its preparation and thus it is preferable to use it partly mixed in combination with slag grains with a larger size. The cement comprising the ultrafine slag dust of this document of the state of the art additionally comprises 18% by total weight of the binder of an alkaline activator composed of a mixture of hydraulic lime and sodium metasilicate (see Example 4 of Table 2). Such a mixture is irritating, related to the use of strong bases, such as sodium metasilicate or $Ca(OH)_2$ in aqueous solution, in large amounts.

Application DE 195 01 100 also discloses mixtures for shotcrete containing blast furnace slag.

The term "Blaine" in the context of the invention is a unit for measuring the fineness of grinding of a solid ingredient, expressed in $cm^2$ per gram of solid; this unit is used to measure the working surface area of the solid grains. The apparatus used to determine the fineness of grinding of a solid in the technical field of cements is known as "Blaine permeability apparatus".

The major disadvantage related to the use of the binders presented above is the presence of strong bases used in large amounts in order to make possible sufficiently rapid setting of the binder. The presence of a source of calcium sulphate in some of these mixtures in a large amount as indicated above, in order to accelerate the curing of the cement, is also harmful. Such an excess of calcium sulphate can result in the formation of an excess of ettringite at an advanced stage of the setting of the cement and during its curing. This excess of ettringite, like the presence of calcium sulphate in large amount which has not reacted, can cause undesirable expansions of the material and consequently a loss in strength and in durability which can end in the destruction of the material.

In order to overcome, in all or part, the abovementioned disadvantages, the present invention has as subject-matter, according to a first aspect, a hydraulic binder comprising:
  at least one first calcium aluminosilicate derivative with a fineness of less than 6000 Blaine,
  slag microparticles with a fineness of greater than or equal to 6000 Blaine in an amount of between 1 and 35% of the total weight of the binder, preferably of between 5 and 15%,
  at least one source of calcium sulphate and
  at least one base in an amount of less than or equal to 1% of the total weight of the binder.

The inventors have demonstrated, unexpectedly, that an addition of a small amount of slag dust or microparticles to the binder increases the reactivity of the said binder during the setting and/or curing thereof, without it being of use to resort to an activator system comprising a significant amount of base (alkaline system). The amounts of base necessary for satisfactory activation of the reaction for hydration and dissolution in water of the binder according to the invention are very low. The inventors have established that the slag microparticles act in the manner of nucleating agents and make possible rapid initialization of the process for dissolution and hydration of the composition of the binder on contact with the water.

There is thus available an effective binder which is ready for use in the preparation of construction materials and which does not require specific precautions in view of the chemical risks when possibly directed onto skilled building workers who have to handle it daily.

In the context of the present invention, when a range of values is defined by the terms "amount of between X and Y", the units X and Y are included in the range of values thus defined.

In the context of the present invention, the amounts given as percentage of the total weight of the binder are given for the dry binder.

Preferably, the total amount of base present in the hydraulic binder according to the invention does not exceed 1% of the total weight of the binder.

Preferably, the calcium aluminosilicate derivatives with a fineness of less than 6000 Blaine of the composition of the binder according to the invention comprise a ground granulated blast furnace slag, fly ash such as aluminosilicate fly ash, calcined clay and/or expanded clay dust. It is also possible, complementarily or alternatively, to put, into the composition of the binder according to the invention, lime-alumina-silica fly ash, particularly from coal (lignite, sub-bituminous coal, hard coal, and the like).

These calcium aluminosilicate derivatives are essentially wastes from the steel industry or from the mining industries, such as the coal industry, and it is therefore advantageous to be able to thus give added value to such materials in order to prevent them from being landfilled.

Preferably, the calcium aluminosilicate derivatives with a fineness of less than 6000 Blaine of the composition of the binder according to the invention described above comprise a ground granulated blast furnace slag in an amount of between 50 and 98% of the total weight of the binder and preferably between 80 and 95%.

The grains of ground granulated blast furnace slags have a fineness usually of the order of 3800 to 4500 Blaine. To obtain ground granulated blast furnace slags within this range of fineness requires a grinding carried out in any type of grinder (ball mills, edge-runner mills, and the like). The grinding does not consume much energy and the equivalent $CO_2$ footprint remains low (from 25 to 60 kg of $CO_2$ per tonne of ground slag). This $CO_2$ footprint is much lower than that obtained with conventional Portland cement (approximately 1 tonne of $CO_2$ per tonne of Portland cement). It is therefore advantageous to increase the share of ground granulated blast furnace slag in this range of fineness in the composition.

Preferably, the binders of the invention described above comprising fly ash, such as aluminosilicate fly ash or lime-alumina-silica fly ash, comprise an amount thereof of less than or equal to 50% of the total weight of the binder, preferably between 5 and 20%.

Aluminosilicate fly ash, known under the name of class F fly ash, differs from lime-alumina-silica fly ash, known under the name of class C fly ash, in its respective calcium content. Class F fly ash comprises less than 8% of calcium, and is less reactive than class C fly ash which comprises more than 8% by weight thereof.

Likewise, the binders of the invention comprising expanded and/or calcined clay dust comprise an amount of each type of dust of less than or equal to 50% of the total weight of the binder.

The slag microparticles of the composition according to the invention preferably have a fineness of between 6000 and 15 000 Blaine and more preferably still a fineness of between 6000 and 9000 Blaine and more preferably still 7000 and 8000 Blaine.

Given that the grinding of the slag particles to a fineness of greater than or equal to 6000 Blaine is an operation which consumes energy and produces carbon dioxide, it is preferable to incorporate, in the composition, grains of a fineness sufficient to suitably activate the mixture without, however, it being necessary to resort to dust which is excessively fine. Furthermore, the inventors have established that, for the majority of the binder compositions which appear in the examples described subsequently, to increase the fineness beyond 8000 Blaine does not make it possible to substantially increase the reactivity. For finenesses beyond 9000 Blaine, phenomena of agglomeration are generally observed, which phenomena can limit the phenomenon of acceleration of the reaction brought about by the presence of the microparticles. The slag microparticles having a fineness of between 6000 and 9000 Blaine, indeed even 7000 and 8000 Blaine, thus appear to offer the best compromise.

The compositions according to the invention advantageously comprise a source of calcium sulphate, such as gypsum, calcium sulphate hemihydrate, anhydrite and phosphogypsum, taken alone or in combination, in an amount of between 1 and 5% of the total weight of the binder and, preferably, this source of calcium sulphate is in an amount of between 2 and 4% of the total weight of the binder.

Such an amount of calcium sulphate in the mixture guarantees satisfactory activation at the start of the reaction and trapping of the water, while avoiding excessively great late formation of ettringite. It is thus the best compromise for satisfactory starting of the reaction without weakening the material during the stages subsequent to the setting of the binder.

The hydraulic binder according to the invention advantageously comprises sulphates of alkali metals, such as lithium, sodium and/or potassium, preferably in an amount of less than or equal to 1% of the total weight of the binder: the inventors have also shown that such an addition of alkali metal salt in such proportions promotes the setting of the binder and is favourable in particular in combination with a source of calcium sulphate.

Preferably, the base included in the binder according to the invention described above is taken in an amount of less than or equal to 0.5% and preferably ranging from 0.2 to 0.4% of the total weight of the binder.

The base present in the composition according to the invention is, for example, an alkali metal or alkaline earth metal hydroxide, such as KOH or $Ca(OH)_2$. It can also be an alkali metal or alkaline earth metal carbonate, such as $Na_2CO_3$, $K_2CO_3$ or $Li_2CO_3$, or also an alkali metal or alkaline earth metal silicate derivative, such as sodium metasilicate. It can also be a mixture of bases, comprising in particular the above-mentioned bases, such that the said mixture of bases is taken in an amount of less than or equal to 0.5%, and preferably from 0.2 to 0.4% of the total weight of the binder.

The hydraulic binder according to the invention can advantageously comprise Portland cement and/or cement known as calcium sulphoaluminate cement hereinafter, preferably in amounts of less than or equal to 4% of the total weight of the binder.

The hydraulic binder as described above can be hydrated at ambient temperature or at high temperatures (greater than 200° C.), depending on the application targeted.

The binder according to the invention is advantageously used in combination with fillers, sand, pigments and/or aggregates, such as quartz, limestone and/or dolomite. In addition, it can also be used in combination with fillers of low density, such as expanded glass, expanded clay, expanded polystyrene, vermiculite and/or expanded perlite.

The binder according to the invention can be used in combination with other cements, such as calcium aluminate cement and/or calcium sulphoaluminate cement.

Accelerators and retarders can advantageously be added to the composition of the binder, typically in contents of less than or equal to 1% by total weight of binder.

The binder compositions according to the invention can also comprise adjuvants, such as plasticizers, for example products based on polycarboxylic acids and preferably on polycarboxylic ethers, lignosulphonates, polynaphthalenesulphonates, melamine-based superplasticizers, polyacrylates and/or vinyl copolymers, typically in contents of less than or equal to 10% by total weight of binder. They can also comprise polymers, such as cellulose ethers.

Likewise, the compositions according to the invention can comprise admixtures, such as polymers in the liquid form and/or in the redispersible powder form, typically in contents of less than or equal to 10% by total weight of binder.

Likewise again, the compositions according to the invention can comprise defoamers or surfactants, hydrophobic agents, surface-active agents and/or corrosion inhibitors, typically in contents of less than or equal to 1% by total weight of binder.

Another subject-matter of the present invention, according to a second aspect, is a concrete, a mortar, a ready-mixed mortar, a prefabricated component, a brick, a board, a block or a covering panel comprising at least one hydraulic binder as described above.

The concretes, mortars or ready-mixed mortars, such as adhesives for tiling or structural parts, such as, for example, adhesives for the bonding of ceramic or glass tiles, prepared from the binder according to the invention have a very satisfactory short-term curing.

The binders according to the invention are particularly suited to use in or with materials intended to be subjected to a permanent water flow. Such materials, in particular concretes or mortars, which incorporate the binder according to the invention make it possible to avoid phenomena of efflorescence, which are generally unsightly as a particular consequence thereof is the appearance of white powdery materials on the surface.

The construction materials, such as those mentioned above, which incorporate the hydraulic binder according to the invention have demonstrated good resistance to chemical agents, in particular to acid rain and to sulphate water and other external or internal chemical attacks.

The binders according to the invention can also advantageously be incorporated in any type of ready-mixed mortar, such as fixing mortars and more particularly pointing mortars, adhesive mortars, adhesives and more particularly adhesives for a ceramic board.

The pointing mortars prepared with at least one binder according to the invention make possible the specific filling of the voids between different building or tiling components.

One or more hydraulic binders according to the present invention, taken as a mixture with aggregates, polymers and/or other organic additives, also make it possible to prepare adhesive mortars and adhesives for the bonding of the construction materials for the building.

For its part, the assembling mortar, addition of one or more binders according to the invention, of aggregates, of additives and/or of admixtures, is used for the assembling of building components. It may be intended for the application to thick or thin joints.

The ready-mixed mortars or concretes according to the invention can also be mortars or concretes for screeds and more generally any type of mortar for the floor which incorporates in particular smoothing finishes. They can also be coatings of the shotcrete type.

The ready-mixed mortars or concretes according to the invention can also be repair mortars, which have an important role for structures. They make possible the renovation of concrete or its partial replacement. Mention will be made, for example, of injection mortars, which are fluids intended to fill in fissures or cavities. The latter are generally applied by injection under pressure.

The ready-mixed mortars or concretes according to the invention can advantageously be facade mortars, such as smoothing mortars, undercoats, single-coat renderings, organic finishing mortars and compositions for rendering impermeable and leaktight.

The smoothing mortars according to the invention are advantageously used for the finishing of a substrate (wall, floor, ceiling, and the like) in order to obtain a flat and smooth surface.

The undercoat mortars according to the invention advantageously make it possible to produce at least one intermediate coat of a "multicoat" coating system.

The single-coat mortars are applied as one coat, which can perform functions of rendering impermeable and of decorating.

The mortars for rendering impermeable and leaktight according to the present invention are characterized by their resistance to rainwater, which makes them excellent products for protecting against bad weather; they are thus mortars of choice for application on the facades of buildings.

The ready-mixed mortars according to the invention can also be any type of coating, and also rough-cast plasters, for work internally or externally.

Typically, the ready-mixed concretes or mortars according to the invention are ready for use and are advantageously used to dress facades, to bring off the placing of a prefabricated component, tile or covering panel and generally to construct and maintain any type of structure of the building.

The covering panels or boards according to the invention will ideally have a thickness of 3 to 25 mm. They can preferably be manufactured by mixing the binder with aggregates, fillers or other materials, followed by a stage of curing and then by a stage of cutting up.

A subject-matter of the present invention, according to a third aspect, is a process for the preparation of a construction material, such as those described above, comprising the stages:

1) adding at least one type of aggregate, sand and optionally at least one admixture, and
2) hydrating the hydraulic binder according to the invention described above.

The aggregates added to the mixture depend on the nature of the material which it is desired to obtain. They are generally gravel, sand, dolomite, limestone of different particle sizes.

The present invention and its advantages will be better understood on reading the examples which follow, which are given solely by way of illustration and which may not under any circumstances be regarded as limiting.

EXAMPLES

TABLE 1

| Adhesive binder for tiling with sand | | Amount as percentage of the total weight of dry composition | Total |
|---|---|---|---|
| CaSO$_4$ | % | 1.5 | |
| Fly ash | % | 5.0 | |
| Slag (4000 Blaine) | % | 35.0 | |
| Slag (7500 Blaine) | % | 4.5 | |
| Silica sand | % | 49.0 | |
| Portland cement 52.5 | % | 1.0 | |
| Polymer (vinyl acetate/ethylene copolymer) powder | % | 3.4 | |
| Cellulose ether | % | 0.4 | |
| Alkaline sulphate | % | 0.10 | |
| Alkaline carbonate | % | 0.10 | 100.0 |

Table 1 gives a composition of a binder according to the invention, to which sand is added, intended mainly for the adhesive bonding of tiles to any type of wall. Such an adhesive binder, after addition of 25% of water at a temperature of approximately 22° C., gives a paste with a creamy consistency. Such a binder is of the C2 TE S1 type.

Tests carried out in order to measure the adhesive strength of the adhesive binder, the dry composition of which is given in Table 1, have been carried out; they are summarized in Table 2.

Dry samples 1, 2 and 3 correspond to tensile strength tests carried out on tiles attached to a flat support by virtue of the binder with sand according to Table 1. The pull-off strength, expressed in N/mm$^2$, is measured by pulling off on samples 1, 2 and 3 after, respectively, 24 hours, 7 days and 28 days of storage under the standard conditions, i.e. at a temperature of 23° C. with a relative humidity of 50%.

Wet sample 4 corresponds in the same way to a tensile strength test carried out on tiles attached to a flat support by virtue of the binder with sand according to Table 1. The pull-off strength, expressed in N/mm$^2$, is measured by pulling off on sample 4 after respectively 7 days of storage under the standard conditions, followed by 21 days of storage immersed in water at 23° C.

70° C. sample 5 corresponds in the same way to a tensile strength test carried out on tiles attached to a flat support by virtue of the binder with sand according to Table 1. The pull-off strength, expressed in N/mm$^2$, is measured by pulling off on sample 5 after respectively 14 days of storage under the standard conditions, followed by 14 days of storage at 70° C., followed again by 1 day under the standard conditions.

Dry sample 6 corresponds to an adhesion force test carried out on an earthenware tile placed on a flat support, 20 minutes after the application of the binder with sand according to Table 1 to the tile and/or to the flat support. The pull-off strength, expressed in N/mm$^2$, is measured by pulling off on sample 6 after respectively 28 days of storage under the standard conditions.

All the tests were carried out according to European standard EN 12004. It emerges from Table 2 that the tests all met the criteria required by this standard, given that the values measured are all above the minimum values required.

TABLE 2

| Adhesive strength | | Measured | Expected |
|---|---|---|---|
| Dry Sample 1 | N/mm$^2$ | 0.55 | |
| Dry Sample 2 | N/mm$^2$ | 1.78 | |
| Dry Sample 3 | N/mm$^2$ | 1.72 | 1 |
| Wet Sample 4 | N/mm$^2$ | 2.13 | 1 |
| 70° C. Sample 5 | N/mm$^2$ | 2.23 | 1 |
| Dry Sample 6 | N/mm$^2$ | 0.86 | 0.5 |

Tests carried out in order to measure the resistance to deformation of the adhesive binder, the dry composition of which, to which sand has been added, is given in Table 1, have been carried out; they are summarized in Table 3. The corresponding expected deformation according to European standard EN 12002 is given by way of comparison. In this case too, the result obtained is very satisfactory.

TABLE 3

| Deformation | | Measured | Expected |
|---|---|---|---|
| Strength | N | 6.27 | |
| Deformation | mm | 2.88 | 2.5 |

The invention claimed is:

1. A hydraulic binder, comprising:
    a calcium aluminosilicate derivative having a fineness of less than 6000 Blaine;
    from 1 to 35% of slag microparticles having a fineness of greater than or equal to 6000 Blaine, based on a total weight of the binder;
    a component comprising calcium sulphate; and
    a base, which is present and present in an amount of less than or equal to 1%, based on a total weight of the binder,
    wherein the calcium aluminosilicate derivative comprises fly ash, expanded clay dust, and/or calcined clay dust, and wherein the fly ash, expanded clay dust, and/or calcined clay dust is present and present in an amount less than or equal to 50%, based on a total weight of the binder.

2. The hydraulic binder of claim 1, wherein the calcium aluminosilicate derivative further comprises a ground granulated blast furnace slag.

3. The hydraulic binder of claim 1, wherein the slag microparticles have a fineness in a range from 6000 to 15 000 Blaine.

4. The hydraulic binder of claim 1, wherein the component comprising calcium sulphate is at least one selected from the group consisting of gypsum, calcium sulphate hemihydrate, anhydrite, and phosphogypsum, and a content of the component comprising calcium sulphate in the binder is in a range from 1 to 5%, based on a total weight of the binder.

5. The hydraulic binder of claim 1, further comprising:
    at least one metal sulphate selected from the group consisting of lithium sulphate, sodium sulphate, and potassium sulphate in an amount of less than or equal to 1%, based on a total weight of the binder.

6. The hydraulic binder of claim 1, wherein the base is at least one selected from the group consisting of KOH, Ca(OH)$_2$, Na$_2$CO$_3$, K$_2$CO$_3$, and LiCO$_3$, and a content of the base in the binder is less than or equal to 0.5%, based on a total weight of the binder.

7. The hydraulic binder of claim 1, further comprising:
    at least one cement selected from the group consisting of Portland cement, calcium aluminate, and calcium sulphoaluminate cement.

8. The hydraulic binder of claim 1, comprising from 5 to 15% of the slag microparticles, based on a total weight of the binder.

9. The hydraulic binder of claim 1, wherein the calcium aluminosilicate derivative comprises from 5 and 20% of the fly ash, based on a total weight of the binder.

10. The hydraulic binder of claim 1, wherein the calcium aluminosilicate derivative comprises the expanded clay dust.

11. The hydraulic binder of claim 1, wherein the calcium aluminosilicate derivative comprises the calcined clay dust.

12. The hydraulic binder of claim 3, wherein the slag microparticles have a fineness in a range from 6000 to 9000 Blaine.

13. The hydraulic binder of claim 3, wherein the slag microparticles have a fineness in a range from 7000 to 8000 Blaine.

14. The hydraulic binder of claim 4, wherein a content of the component comprising calcium sulphate in the binder is in a range from 2 to 4%, based on a total weight of the binder.

15. The hydraulic binder of claim 6, wherein a content of the base in the binder is in a range from 0.2 to 0.4%, based on a total weight of the binder.

16. A construction material, comprising a hydraulic binder of claim 1,
wherein the construction material is concrete, mortar, ready-mixed mortar, a prefabricated component, brick, board, block, or a covering panel.

17. A process for the producing the construction material of claim 16, the process comprising:
1) adding an aggregate, sand, and optionally an admixture; and
2) hydrating the hydraulic binder.

18. A hydraulic binder, comprising:
a calcium aluminosilicate derivative having a fineness of less than 6000 Blaine;
from 1 to 35% of slag microparticles having a fineness of greater than or equal to 6000 Blaine, based on a total weight of the binder;
from 1 to 5% at least one component comprising calcium sulphate selected from the group consisting of gypsum, calcium sulphate hemihydrate, anhydrite, and phospho-gypsum; and
a base, which is present and present in an amount of less than or equal to 1%, based on a total weight of the binder,
wherein the calcium aluminosilicate derivative comprises from 50 to 98% of a ground granulated blast furnace slag, based on a total weight of the binder.

19. The hydraulic binder of claim 18, wherein the calcium aluminosilicate derivative comprises from 80 to 95% of the ground granulated blast furnace slag, based on a total weight of the binder.

20. A construction material, comprising a hydraulic binder of claim 18, wherein the construction material is concrete, mortar, ready-mixed mortar, a prefabricated component, brick, board, block, or a covering panel.

* * * * *